US007366097B2

(12) United States Patent
Zuberi (10) Patent No.: US 7,366,097 B2
(45) Date of Patent: Apr. 29, 2008

(54) INCREASING THE ACCURACY AND EFFICIENCY OF ADMISSION CONTROL FOR DATA STREAMS

(75) Inventor: Khawar M. Zuberi, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 924 days.

(21) Appl. No.: 10/689,400

(22) Filed: Oct. 20, 2003

(65) Prior Publication Data

US 2005/0083841 A1    Apr. 21, 2005

(51) Int. Cl.
*H04J 1/16* (2006.01)
(52) U.S. Cl. .................. 370/231; 370/232; 370/468; 709/225
(58) Field of Classification Search ................ 370/230, 370/235, 468, 231
See application file for complete search history.

(56) References Cited

U.S. PATENT DOCUMENTS

2004/0174815 A1* 9/2004 Khisti et al. ................ 370/235

OTHER PUBLICATIONS

Markaroff et al. (IEEE Transactions on Software Engineering, vol. 27, No. 1, Jan. 2001).*

Design and Implementation of a VBR Continuous Media File Server Dwight Makaroff, Gerald Neufeld & Norman Hutchinson IEEE Transactions on Software Engineering, vol. 27, No. 1 Jan. 2001.

* cited by examiner

*Primary Examiner*—Seema S. Rao
*Assistant Examiner*—Wanda Z Russell
(74) *Attorney, Agent, or Firm*—Workman Nydegger (57) ABSTRACT

The present invention extends to methods, systems, and computer program products for increasing the accuracy and efficiency of admission control for data streams. A transmitting computer system transfers a companion data stream along with a variable rate data stream to simulate the maximum data transfer of the variable rate data stream. Accordingly, active probing experiments conducted at other computer systems receive a more accurate indication of the available bandwidth (or bandwidth that may be available in the future). Computer systems can maintain admission control caches that indicate the results of previously conducted active probing experiments and the network configuration when previous data streams where admitted to a network. Computer systems can refer to an admission control cache when performing admission control to increase the efficiency of admission control. That is, an admission control decision can be made without having to conduct a complete active probing experiment.

28 Claims, 4 Drawing Sheets

INCREASING THE ACCURACY AND EFFICIENCY OF ADMISSION CONTROL FOR DATA STREAMS

BACKGROUND OF THE INVENTION

1. The Field of the Invention

The present invention relates to network communication technology, and more specifically, to mechanisms for increasing the accuracy and efficiency of admission control for data streams.

2. Background and Relevant Art

Computer networks have enhanced our ability to communicate and access information by allowing one computer or device (hereinafter both referred to as a "computing system") to communicate over a network with another computing system using electronic data. When transferring electronic data between computing systems, the electronic message will often pass through a protocol stack that performs operations on the electronic data. The Open System Interconnect ("OSI") model is an example of a networking framework for implementing a protocol stack.

The OSI model breaks down the operations for transferring electronic data into seven distinct "layers," each designated to perform certain operations in the data transfer process. While protocol stacks can potentially implement each of the layers, many protocol stacks implement only selective layers for use in transferring electronic data across a network. When electronic data is transmitted from a computing system, it originates at the application layer and is passed down to intermediate lower layers and then onto a network. When electronic data is received from a network it enters the physical layer and is passed up to higher intermediate layers and then eventually received at the application layer.

The application layer, the upper most layer, is responsible for supporting applications and end-user processes. An intermediate layer incorporated by most protocol stacks is the transport layer, which at the very least functions to multiplex application data into transport layer segments for delivery to lower layers and to demultiplex transport layer segments into application data for delivery to applications. The User Datagram Protocol ("UDP") is an example of a protocol implemented at the transport layer that does little more than multiplex/demultiplex data for compatible transfer between applications and networks. Another common protocol implemented at the transport layer is the Transmission Control Protocol ("TCP"), a connection-oriented protocol that can also provide the features of end-to-end error recovery, resequencing, and flow control to the application layer.

UDP is particularly well suited for transferring real-time data, such as, for example, audio and video data ("A/V data"), as a steady and continuous stream (frequently referred to as "streaming") between computing systems. Since output of real-time data often includes refreshing previously received real-time data, some loss of real-time data (e.g., such as the inherent data loss in many networks) from a real-time data stream is not critical. For example, when video data for a video frame is not received, a display screen may appear to momentarily flicker but is then refreshed when updated video data is received. Accordingly, UDP is frequently used to transfer real-time data streams between computing systems in Home Network, Local Area Network, and Wide Area Network environments.

Unfortunately, UDP has no built in mechanism for congestion control. Thus, a computing system utilizing UDP to transmit a real-time data stream typically cannot detect when transmission of the real-time data stream is being degraded due to network congestion. Likewise, a computing system utilizing UDP to transmit a real-time data stream typically cannot detect when the real-time data stream is causing network congestion that degrades other (possibly also real-time) data streams. Thus, it may be that a real-time data stream is transmitted onto a network with other existing data streams thereby potentially degrading the quality of all the data streams.

For example, when a 10 Mega-bit per second ("Mbps") Ethernet Hub is supporting an existing 6 Mbps High Definition Television data stream and another 6 Mbps High Definition Television data stream is initiated, both data streams may suffer from high delay, jitter, and packet loss. Further, since the transmission speed of UDP is only constrained by the rate at which an application generates data and the capabilities of the source (CPU, clock rate, etc.), it would not be uncommon to have a number real-time data streams transmitting data at high bit rates at any given time. Although, TCP has a congestion control mechanism, the TCP congestion control mechanism is not well suited for real-time applications, such as, for example, those applications that transmit A/V data streams. The TCP congestion control mechanism reduces the bit rate when one or more data links between a sending computing system and a receiving computing system become excessively congested. However, a reduction in bit rate can degrade real-time data streams, which can tolerate some packet loss but typically require a minimum bit rate.

It may also be that when a network becomes congested, one real-time data stream gets a disproportionate amount of bandwidth (commonly referred to as the "Ethernet Capture Effect"). Thus, a newer real-time data stream could possibly "take-over" bandwidth from an existing real-time data stream. This may leave an existing user of an existing real-time data stream dissatisfied. An initiating user of a newer real-time data stream may not have actively desired to degrade the existing real-time data stream. However, the initiating user may have no way to determine if the network could support both real-time data streams prior to initiating the newer real-time stream.

Accordingly, probing techniques have been developed to attempt to determine if a network has sufficient available bandwidth to support an A/V data stream or other type of real-time data stream before allowing the A/V data stream or other type of real-time data stream onto the network. One probing technique includes a transmitting computer system passively detecting a transmitting side data load. The transmitting side data load is subtracted from the transmitting side bandwidth capacity, such as, for example, 10 mega-bits per second ("Mbps"), to calculate the available transmitting side bandwidth. When the available transmitting side bandwidth is greater than a requested application bit rate, the available transmitting side bandwidth is viewed as sufficient to receive the application data stream. Depending on network configuration, the transmitting side computer system also sends instructions to the receiving side computer system to calculate the available receiving side bandwidth. When the available receiving side bandwidth is greater than the requested application bit rate, the available receiving side bandwidth is viewed as sufficient to receive the application data stream.

Another probing technique includes a transmitting computer system transmitting a first packet-pair data packet and then subsequently transmitting a second packet-pair data packet, both via a network data path, to a receiving computer system. The receiving computer system receives the first packet-pair data packet at a first reception time and the second packet-pair data packet at a second reception time. Based at least on the difference in the first reception time and the second reception time, the bottleneck bandwidth of the network data path is estimated. When the bottleneck bandwidth is greater than the requested application bit rate, the available network data path bandwidth is viewed as sufficient to receive the application data stream.

Yet another probing technique includes a transmitting computer system identifying parameters for configuring trains of data packets to simulate transmitting the application data stream at the requested application bit rate. The transmitting computer system temporarily transmits a train of data packets in accordance with the identified parameters to simulate transmission of the application data stream. The receiving computer system receives at least some of the data packets in the train of packets. The receiving computer system calculates (e.g., based on reception time intervals) whether the train of data packets caused the network data path to transition into a congested state.

It may be that a number of these probing techniques are utilized in combination as part of an admission control function to determine whether introduction of a new real-time data stream onto a network would significantly degrade other (possibly also real-time) data streams already on the network. However, many real-time data streams are variable bit rate ("VBR") data streams. That is, the actual bit rate at any given time can vary (possibly significantly) between zero and a specified maximum bit rate. Thus, there is always some possibility that at the time probing occurs, one or more real-time data streams are transmitting at less than their maximum bit rate. Accordingly, the results of probing a network that carries VBR data streams may not be entirely accurate.

For example, on a network that can support an aggregate bit rate of 10 Mbps, probing results may indicate that existing data streams are consuming 4 Mbps, and thus, 6 Mbps is available. However, if at the time of probing, the 4 Mbps is being consumed by a VBR data stream having a bit rate in a range between 3 Mbps and 6 Mbps, 4 Mbps is not an accurate indication of the available bandwidth. That is, although probing results indicate that 6 Mbps is available, introducing a new data stream at a bit rate greater than 4 Mpbs (the available bandwidth when the VBR data stream is at its maximum bit rate) can result in degradation of the new data stream and/or the existing VBR data stream.

Further, an admission control function is typically executed each time a new real-time data stream requests admission to a network. Depending on the types of probing techniques included in an admission control function, the admission control function can take some amount of time (e.g., up to three seconds) to complete. During the time the admission control function is executing, a user may be prevented from utilizing a computer system for desired purposes. For example, a user may be prevented from watching a television program until admission control for the real-time data stream carrying the television program has completed. Thus, each time a user desires to start a real-time data stream, the user would have to wait for the admission control function to complete. Waiting for an admission control function to complete degrades a user's experience.

The combined waiting time for admission control functions can further degrade a user's experience when the user frequently starts and stops data streams. Even if a user frequently starts and stops the same data streams (e.g., turning a stereo on and a television off), the complete admission control process if performed each time a data stream (even the same data stream) requests admission to the network. Therefore systems, methods, and computer program products for enhancing admission control for data streams would be advantageous.

BRIEF SUMMARY OF THE INVENTION

The foregoing problems with the prior state of the art are overcome by the principles of the present invention, which are directed towards methods, systems, and computer program products for increasing the accuracy and efficiency of admission control for data streams. A transmitting computer system and a requesting computer system (and potentially one or more other computer systems) are connected to a network, such as, for example, a Home Network or Local Area Network. At least some of the connected computer systems are configured to transmit data streams, such as, for example, Audio/Visual ("A/V") data streams, to other connected computer systems. The bit rate of some data streams can vary over time depending on the content (e.g., the changes between sequential video frames) that is being transmitted (hereinafter referred to as "variable bit rate data streams").

The transmitting computer system identifies a maximum bit rate at which a variable bit rate data stream can be transmitted. For example, when an application requests admission of a data stream onto the network, the application may provide a desired maximum bit rate. The transmitting computer system transmits the variable bit rate data stream a rate less than or equal to the maximum bit rate. For example, when video data does not change significantly between video frames, the transmitting computer system may be able to appropriately transmit the video data at less than the maximum bit rate.

The requesting computer system broadcasts a start admission control message to all other connected computer systems. The transmitting computer system receives the start admission control message. In response to the start admission control message, the transmitting computer system transmits a companion data stream along with the variable bit rate data stream. The combined bit rate of the companion data stream and the variable bit rate data stream at least approximate the maximum bit rate.

The requesting computer system conducts an active probing experiment to identify available bandwidth of the network. The requesting computer system determines if the network has sufficient bandwidth for a new data stream based on results of the active probing experiment. Since the combined bit rate of the companion data stream and the variable bit rate data stream at least approximates the maximum bit rate, the results of the active probing experiment more accurately represent available bandwidth. That is, there is a reduced chance of the active probing experiment inappropriately indicating sufficient bandwidth for a new data steam when the variable bit rate data stream being transmitted at less than the maximum bit rate.

The requesting computer system broadcasts an end admission control message to all other connected computer systems. The transmitting computer system receives the end admission control message. In response to the end admission control message, the transmitting computer system terminates transmission of the companion data stream.

A computer system (e.g., a media server) connected to the network can maintain an admission control cache that stores one or more network configurations. Each stored network configuration can represent one or more data streams and the bandwidth consumed by the one or more data streams. The computer system identifies a current network configuration. Identifying a network configuration can include identifying the characteristics (e.g., bit rate) of data streams being transmitted across the network. The computer system can store the network configuration in the admission control cache.

The computer system receives an application request to admit a new data stream onto the network. The computer system refers to the admission control cache entry that corresponds to the data stream and the current network configuration. The computer system determines if the new data stream is to be admitted onto the network base at least in part on rules contained in the entry. Accordingly, reduced time and resources are consumed when determining whether or not to admit the new data stream to the network. For example, it may be that complete active probing experiments are not needed since the results of prior active probing experiments are cached. Thus, admission control can also be performed more efficiently and quickly. An admission control cache can be particularly advantageous in a home network environment since home networks may include a limited number of computer systems that operate in a limited number of different configurations.

Additional features and advantages of the invention will be set forth in the description that follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

The principles of the present invention provide for increasing the accuracy and efficiency of admission control for real-time data streams. A transmitting computer system and a requesting computer system (and potentially one or more other computer systems) are connected to a network, such as, for example, a Home Network or Local Area Network. At least some of the connected computer systems are configured to transmit data streams, such as, for example, Audio/Visual ("A/V") data streams, to other connected computer systems. The bit rate of some data streams can vary over time depending on the content (e.g., the changes between sequential video frames) that is being transmitted (hereinafter referred to as "variable bit rate data streams").

When the requesting computer system requests admission of a new data stream, a transmitting computer system sends a companion stream along with a variable bit rate data stream to simulate that the variable bit rate data stream is transmitting at a maximum bit rate. Accordingly, results of an active probing experiment performed by the requesting computer system can more accurately represent the available bandwidth of the network. A computer system (e.g., a media server) can maintain an admission control cache that stores network configuration. During the admission control process a requesting computer system can refer to the admission control cache to determine, at least in part, whether the network has sufficient bandwidth for a new data stream. Accordingly, admission control can be performed more efficiently and consumes reduced resources (e.g., complete active probing experiments may not be needed).

Embodiments within the scope of the present invention include computer-readable media for carrying or having computer-executable instructions or data structures stored thereon. Such computer-readable media may be any available media, which is accessible by a general-purpose or special-purpose computer system. By way of example, and not limitation, such computer-readable media can comprise physical storage media such as RAM, ROM, EPROM, CD-ROM or other optical disk storage, magnetic disk storage or other magnetic storage devices, or any other media which can be used to carry or store desired program code means in the form of computer-executable instructions, computer-readable instructions, or data structures and which may be accessed by a general-purpose or special-purpose computer system.

In this description and in the following claims, a "network" is defined as one or more data links that enable the transport of electronic data between computer systems and/or modules. When information is transferred or provided over a network or another communications connection (either hardwired, wireless, or a combination of hardwired or wireless) to a computer system, the connection is properly viewed as a computer-readable medium. Thus, any such connection is properly termed a computer-readable medium. Combinations of the above should also be included within the scope of computer-readable media. Computer-executable instructions comprise, for example, instructions and data which cause a general-purpose computer system or special-purpose computer system to perform a certain function or group of functions. The computer executable instructions may be, for example, binaries, intermediate format instructions such as assembly language, or even source code.

In this description and in the following claims, a "computer system" is defined as one or more software modules, one or more hardware modules, or combinations thereof, that work together to perform operations on electronic data. For example, the definition of computer system includes the hardware components of a personal computer, as well as software modules, such as the operating system of the personal computer. The physical layout of the modules is not important. A computer system may include one or more computers coupled via a network. Likewise, a computer system may include a single physical device (such as a mobile phone or Personal Digital Assistant "PDA") where internal modules (such as a memory and processor) work together to perform operations on electronic data.

In this description and in the following claims, a "data stream" is defined as data that is transferred in a steady and continuous stream such that portions of the transferred data can be output as they are received (even if received before completion of the data stream). A data stream can be an audio and/or video data stream (e.g., an Audio/Video or "A/V" data stream) that is delivered from a transmitting computer system for output at a receiving computer system. Data streams can be a live data streams, such as, for example, a data stream of live radio or television broadcast data. Likewise, data streams can result when a stored file at a transmitting computer system is transferred to a receiving computer system, such as, for example, a data stream that results when a stored Motion Pictures Expert Group ("MPEG") file is selected. Data included in a data stream may or may not be saved at a receiving computer system after the data is output. Data streams can be transferred using a wide variety of protocols or combination of protocols, such as, for example, User Datagram Protocol ("UDP"), Real-Time Transport Protocol ("RTP"), and Real Time Streaming Protocol ("RTSP").

In this description and in the following claims, "data transfer rate" is defined as the speed with which data is transferred (or is to be transferred) onto a data link, across a data link, or received from a data link. A data transfer rate can be measured in a variety of different units, such as, for example, Megabits per second ("Mbps") (which hereinafter may be referred to as a "bit rate") and Megabytes per second ("MBps"). For example, application module 112 may cause an audio data stream to be transmitted at a data transfer rate of 2 Mbps (across data links 102 and 104) to computer system 123.

In this description and the following claims, a "data hub" is defined as a computer system that operates as a common connection point (either wired or wireless) for other computer systems and transfers electronic data between connected computer systems by sending received data packets out all the ports of the hub. That is, when a data packet is received at one port of a data hub, the data hub copies the packet to all of the other ports of the data hub. As a result, a data packet received from one data link connected to the data hub is subsequently transferred to all the other data links connected to the data hub.

In this description and in the following claims, a "data switch" is defined as a computer system that operates as a common connection point (either wired or wireless) for other computer systems and transfers electronic data between connected computer systems by sending received data packets out ports that correspond to destination address included in data packets. That is, when a data packet is received at one port of the data switch, the data switch reads a destination address (e.g., an Internet Protocol ("IP") address) of the data packet and sends the data packet to the port corresponding to the destination address. As a result, a data packet received from one data link is subsequently transferred to a data link that is nearer to the destination computer system associated with the destination address.

Those skilled in the art will appreciate that the invention may be practiced in network computing environments with many types of computer system configurations, including, personal computers, laptop computers, hand-held devices, multi-processor systems, microprocessor-based or programmable consumer electronics, network PCs, minicomputers, mainframe computers, mobile telephones, PDAs, pagers, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Figure 1:
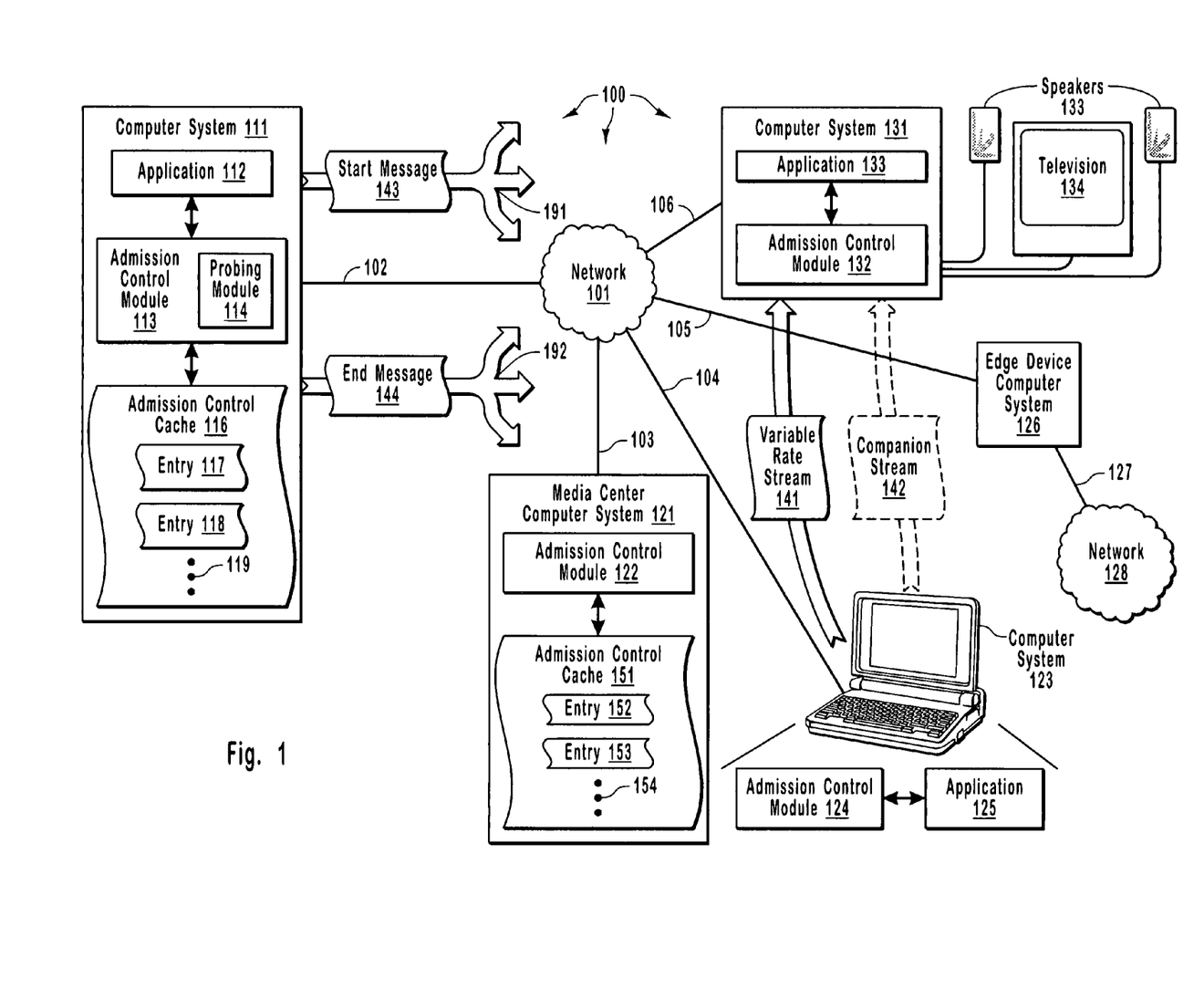
FIG. 1 illustrates an example of a network architecture that facilitates increasing the accuracy and efficiency of admission control for data streams in accordance with the principles of the presenting invention.

FIG. 1 illustrates an example of a network architecture 100 that facilitates increasing the accuracy and efficiency of admission control for data streams in accordance with the principles of the presenting invention. Included in network architecture 100 are computer systems 111, 121, 123, 126, and 131. Computer systems 111, 121, 123, 126 and 131 are connected to network 101 by corresponding data links 102, 103, 104, 105 and 106 respectively. Computer systems depicted in network architecture 100 include corresponding network interface modules for sending electronic data and receiving electronic data.

Network 101 can be a Home network or Local Area Network (hereinafter collectively referred to as a "LAN"). Network 101 may include data hubs and/or data switches (that potentially separate network 101 into different segments). Edge device computer system 126 (e.g., a router, gateway, data switch, and/or firewall) is connected to network 128 by data link 127. Network 128 can be another LAN, a Wide Area Network ("WAN"), or even the Internet. Accordingly, computer systems connected to network 101 can send data to and/or received data from computer systems connected to network 128. Computer system 131 is connected to television 134 and speakers 133. Computer system 131 can receive data from other computer systems (e.g., streaming A/V data) and compatibly format the data for output at television 134 and speakers 133. For example, computer system 131 can receive an A/V data stream from a Digital Versatile Disk ("DVD") player at media center computer system 121.

Data streams (e.g., UDP data streams) can be transferred between the computer systems in network architecture 100 and between computer systems in network architecture 100 and computer systems external to network architecture 100 (e.g., computer systems connected to network 128). Computer systems in network architecture 100 may transfer data streams as a result of a transmitting application at one computer system requesting that a data stream be transferred to a corresponding receiving application at another computer system. For example, application 125 may request transfer of a data stream to application 133. Accordingly, a corresponding network interface can transmit a data stream containing appropriate application data and having a destination address (e.g., an IP address) corresponding to computer system 131. A corresponding network interface at computer system 131 can receive the transmitted data stream and cause contained application data to be delivered to application 133.

Non-streaming data can also be transferred between the computer systems in network architecture 100 and between computer system in network architecture 100 and computer systems external to network architecture 100 (e.g., computer systems connected to network 128). For example, media center computer system 121 may be capable of transferring data to other computer system in a non-streaming manner. When another computer system requests a file stored at media center computer system 121, a corresponding network interface can respond by sending data packets containing the requested file and having a destination address of the requesting computer system. For example, application 112 may be a Web browser that requests a Web page stored at media center computer system 121. Accordingly, media center computer system 121 can respond by transmitting the requested Web page to computer system 111. A network interface can facilitate the transmission of the requested Web page, for example, by sending a HyperText Transfer Protocol ("HTTP") message including the Web page (e.g., as one or more Transmission Control Protocol ("TCP") segments) to computer system 111. A corresponding network interface at computer system 111 can receive the Web page and cause the Web page to be delivered to application 112.

Accordingly, the data links in network architecture 100 may experience varied data loads due to streaming and non-streaming data being transferred across the data links. When data is transmitted onto a data link, some portion of the data link's bandwidth is consumed thereby decreasing the available bandwidth of the data link. On the other hand, when data is removed from a data link (e.g., after completion of a file transfer or the end of a data stream) some portion of the data link's bandwidth is freed up thereby increasing the available bandwidth of the data link.

Generally, admission control modules depicted in network architecture 100 (e.g., admission control modules 113, 122, 124, and 132) are configured to determine when a data stream can be admitted onto network 101. Admission control modules can calculate, based on the results of active probing experiments, results contained in admission control cache entries, and/or requested data transfer rates, when network 101 has sufficient bandwidth to transfer a data stream. When network 101 has sufficient bandwidth, an admission control module can admit a data stream onto network 101. On other hand, when network 101 does not have sufficient bandwidth, an admission control module does not admit a data stream onto network 101.

Admission control caches 116 and 151 contain one or more entries that indicate whether or not a new data stream was admitted to network 101 under particular network conditions (e.g., when other existing data streams were being transferred). Each entry in admission control cache 116 (e.g., entries 117 and 118) and admission control cache 151 (e.g., entries 152 and 153) can correspond to a particular network configuration and a particular data stream. Each entry can indicate whether or not the particular data stream was admitted to network 101 under the particular network configuration. For example, entry 118 can indicate that a data stream from application 112 was admitted to network 101 when variable rate stream 141 was already being transferred on network 101. A series of three vertical periods (a vertical ellipsis) indicates that other entries can be included in an admission control cache. For example, vertical ellipses 119 and 154 indicate that admission control cache 116 and admission control cache 151 can contain additional entries.

During admission control for a data stream, a computer system can conduct active probing experiments to identify available network bandwidth. Based on the available network bandwidth, the computer system can determine whether or not to admit a new data stream. For example, probing module 114 can conduct an active probing experiment to determine if a data stream from application 112 can be admitted onto network 101. The results of active probing experiments and indications of whether or not a data stream was admitted to a network can be cached in an entry of an admission control cache. For example, the results of active probing conducted by admission control module 124 and an indication that variable rate stream 141 was previously admitted and was already being transferred on network 101 can be cached in an entry of admission control cache 116 or admission control cache 151.

Figure 2:
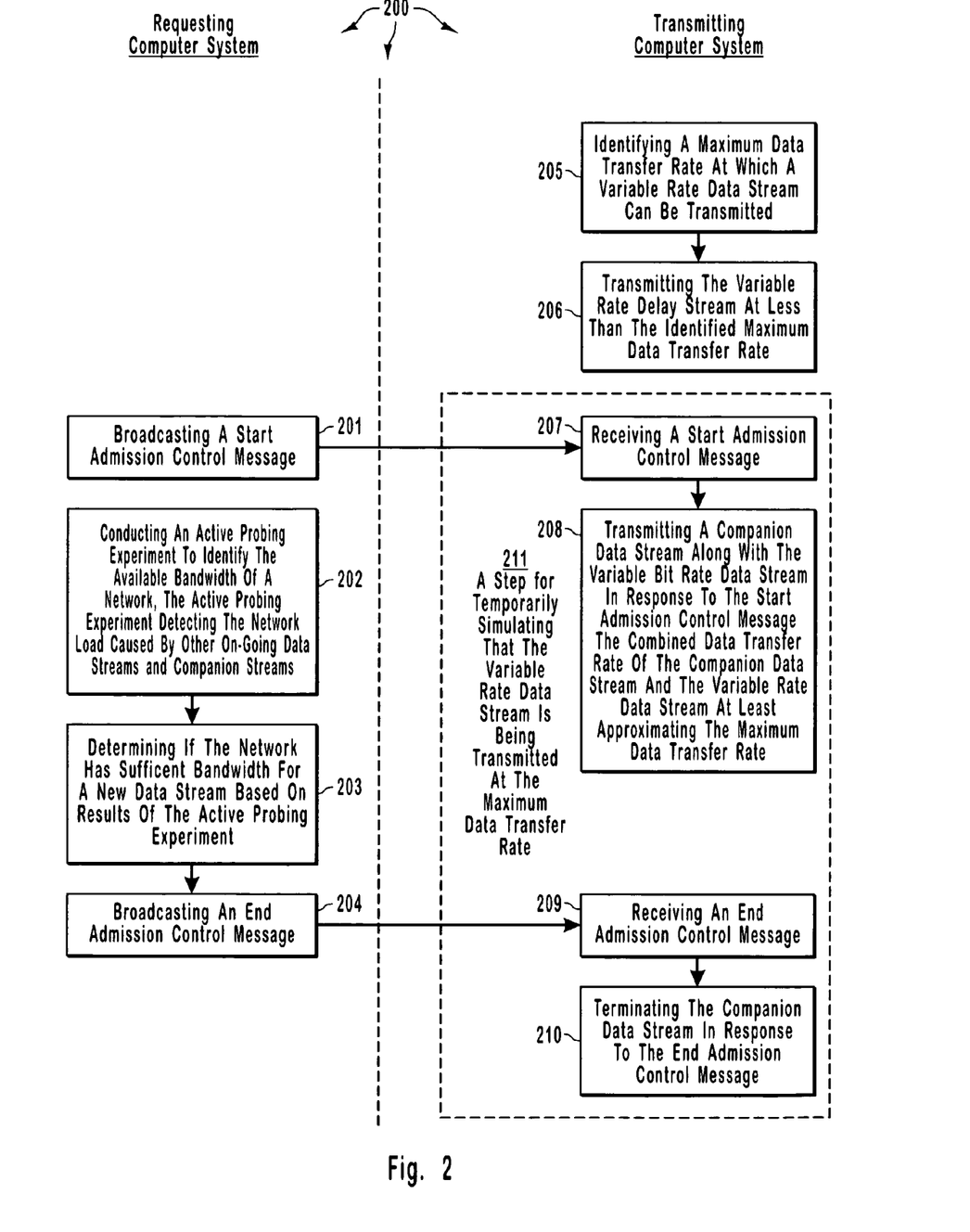
FIG. 2 illustrates an example flowchart of a method for more accurately determining the available bandwidth of a network in accordance with the principles of the present invention

FIG. 2 illustrates an example flowchart of a method 200 for more accurately determining the available bandwidth of a network in accordance with the principles of the present invention. The method 200 will be described with respect to the computer systems, networks, and edge device depicted in network architecture 100.

The method 200 includes an act of identifying a maximum data transfer rate at which a variable rate data stream is to be transmitted (act 205). Act 205 can include a transmitting computer system identifying a maximum data transfer rate at which a variable rate data stream is to be transmitted. For example, computer system 123 can identify a maximum data transfer rate at which variable rate stream 141 is to be transmitted. An application can request a maximum data transfer based in part on the characteristics of the data stream that is to be transmitted. For example, an application 125 may request a maximum data transfer rate of 6 Mbps for a high definition television stream. A maximum data transfer rate can be the greatest data rate at which a data stream is to be transmitted.

The method 200 includes an act of transmitting the variable rate data stream at data transfer rate less than the identified maximum data transfer rate (act 206). Act 206 can include a transmitting computer system transmitting the variable rate data stream at data transfer rate less than the identified maximum data transfer rate. For example, computer system 123 can transmit variable rate stream 141 at less than a maximum data transfer rate requested by application 125 (e.g., 6 Mbps). A variable rate data stream may be transferred at less than a maximum data transfer rate, for example, when sequential data frames of an A/V data stream do not change significantly.

The method 200 includes an act of broadcasting a start admission control message (act 201). Act 201 can include a requesting computer system broadcasting a start admission control message. For example, computer system 111 can broadcast start message 143. Arrows 191 represent that start message 143 is broadcast to all the computer systems connected to network 101. However, for clarity, arrows are not expressly depicted to each computer system.

The method 200 includes a functional result-oriented step for temporarily simulating that the variable rate data stream is being transmitted at the maximum data transfer rate (step 211). Step 211 can include any corresponding acts for accomplishing the result of temporarily simulating that the variable rate data stream is being transmitted at the maximum data transfer rate. However, in the illustrated example of FIG. 2, the step 211 includes a corresponding act of receiving a start admission control message (act 207). Act 207 can include a transmitting computer system receiving a start admission control message. For example, computer system 123 can receive start message 143 from computer system 111.

In the illustrated example of FIG. 2, the step 211 also includes a corresponding act of transmitting a companion data stream along with the variable rate data stream, in response to the start admission control message (act 208). Act 208 can include a transmitting computer system transmitting a companion data stream along with the variable rate data stream, in response to the start admission control message. For example, computer system 123 can transmit companion stream 142 in response to receiving start message 143. The combined data transfer rate of the companion data stream and the variable rate data stream can at least approximate the maximum data transfer rate. Thus, even when the variable rate data stream is not transmitting at the maximum data transfer rate, the companion data stream makes it appear as if data is being transmitted at approximately the maximum data transfer rate.

The method 200 includes an act of conducting an active probing experiment to identify the available bandwidth of the network, the active probing experiment detecting the network load caused by other on-going data streams (e.g., variable rate stream 141) and companion streams (e.g., companion stream 142) (act 202). Act 202 can include a requesting computer system conducting an active probing experiment to identify bandwidth of the network. For example, computer system 111 can conduct an active probing experiment to identify the available bandwidth of network 101. The active probing experiment conducted by computer system 111 can detect network load caused by companion stream 142 (as well as variable rate stream 141). The combined data transfer rate of companion stream 142 and variable rate stream 141 can at least approximate the maximum data transfer rate of variable rate stream 141.

An active probing experiment can include probing module 114 conducting any of a plurality of probing techniques including promiscuous mode measurements to detect a transmitting and/or receiving side data load (e.g., when a data switch separates portions of network 101), packet-pair tests to detect bottle neck bandwidth, sending trains of packets at different bandwidths to detect congestion, or any other technique that can be used to measure network bandwidth. A packet-pair test can include transmission of a packet-pair train to implement any of a variety of different packet-pair algorithms, such as, for example, Receiver Only Packet Pair ("ROPP") algorithms, Receiver Based Packet Pair ("RBPP") algorithms, and Sender Based Packet Pair ("SBPP") algorithms, for calculating a bottleneck bandwidth for a network data path.

Results of an active probing experiment can detect that the combined data transfer rate of the variable rate data stream and the companion data stream is at least an approximation of the maximum data transfer rate. For example, probing module 114 can detect that the combined data transfer rate of variable rate stream 141 and companion stream 142 is an approximation of maximum data transfer rate for variable rate stream 141. Thus, the results of the active probing more accurately indicate the bandwidth that is available (or the bandwidth that may be available in the future). Accordingly, there is a reduced likelihood of admitting a data stream that can adversely impact other data streams on the network (e.g., by congesting the network). For example, if network 101 were a 10 Mbps network and variable rate data stream 141 had a maximum data transfer rate of 6 Mbps, it is unlikely (due to companion stream 142) that a new 5 Mbps data stream would be admitted to network 101, even when variable rate stream 141 is transmitting data at less than 5 Mbps.

The method 200 includes an act of determining if the network has sufficient bandwidth for a new data stream based on the results of the active probing experiment (act 203). Act 203 can include a requesting computer system determining if the network has sufficient bandwidth for a new data stream (potentially also a variable rate data stream) based on the results of the active probing experiment. For example, admission control module 113 can determine if network 101 has sufficient bandwidth for a data stream from application 112 based on the results of active probing experiments conducted by probing module 114.

Sufficient bandwidth is available when the bandwidth capacity of a network (e.g., 10 Mbps) minus the sum of the aggregate data transfer rates of existing data streams is at least equal to the data transfer rate requested for the new data stream. For example, sufficient bandwidth for a data stream from application 112 may be available when the difference of the bandwidth capacity of network 101 minus the sum of the data transfer rates of variable rate stream 141 and companion stream 142 (i.e., at least an approximation of the maximum data transfer rate) is at least equal to a data transfer rate requested by application 112. When sufficient bandwidth is available, a data stream from application 112 can be admitted onto network 101. On the other hand, when sufficient bandwidth is not available, the data stream from application 112 is not admitted onto network 101.

The method 200 includes an act of broadcasting an end admission control message (act 204). Act 204 can include a requesting computer system broadcasting an end admission control message. For example, computer system 111 can broadcast end message 144. Arrows 192 represent that end message 144 is broadcast to all the computer systems connected to network 101. However, for clarity, arrows are not expressly depicted to each computer system.

In the illustrated example of FIG. 2, the step 211 also includes a corresponding act of receiving an end admission control message (act 209). Act 209 can include a transmitting computer system receiving an end admission control message. For example, computer system 123 can receive end message 144.

In the illustrated example of FIG. 2, the step 211 also includes a corresponding act of terminating the companion data stream in response to the end admission control message (act 210). Act 210 can include a transmitting computer system terminating a companion data stream in response to the end admission control message. For example, computer system 123 can terminate companion stream 142 in response to end message 144.

In network architecture 100, companion stream 142 is depicted as a dashed line. The dashed line indicates that companion 142 is temporality transferred (e.g., during the time another computer conducts an active probing experiment) and then terminated (e.g., after the active probing experiment is completed).

The results of active probing experiments conducted by probing module 114 and an indication of whether or not a data stream from application 112 was admitted onto network 101 can be stored in an entry of admission control cache 116 and/or admission control cache 151. Other entries in admission control cache 116 and/or admission control cache 151 can include the results of other active probing experiments and whether or not other data streams where admitted onto network 101. Each entry in an admission control cache can correspond to a particular network configuration (e.g., indicating the data streams being transferred on network 101 at the time an active probing experiment was conducted) Each entry can also indicate whether or not a new data stream was admitted (or not admitted) onto network 101 for a particular network configuration. For example, entry 152 can indicate that a data stream from application 112, at a requested data transfer rate of 4 Mbps, was admitted to network 101 when variable rate stream 141 was being transferred at a maximum data transfer rate of 5 Mbps. On the other hand, entry 153 can indicate that a data stream from application 112, at a requested data transfer of 7 Mps, was not admitted to network 101 when variable rate stream 141 was being transferred at a maximum data transfer rate of 4 Mbps.

In some embodiments, a media server computer system maintains an admission control cache for data streams that originate at other computer systems connected to a network. For example, media server computer system 121 can maintain admission control cache 151 for data streams that originate at the computer systems connected to network 101. In other embodiments, a computer system maintains an admission control cache for data streams that originate at the computer system. For example, computer system 111 can maintain admission control cache 116 for data streams that originate at application 112 (as well as other applications at computer system 111).

When an application subsequently requests admission of a similar (or even the same data stream), a computer system can refer to an admission control cache to determine if the data stream is to be admitted onto a network. A computer system can maintain a list of the maximum data transfer rate of data streams currently on the network (a network configuration). When a request to admit a new data stream is received, the computer system can refer to an entry corresponding to the network configuration. From the entry, the computer system can identify the available network bandwidth and whether there is sufficient available bandwidth for the new data stream. It may also be that an admission control cache contains "Yes"/"No" indications indicating if the new data stream can be admitted to a particular network configuration.

Figure 3:
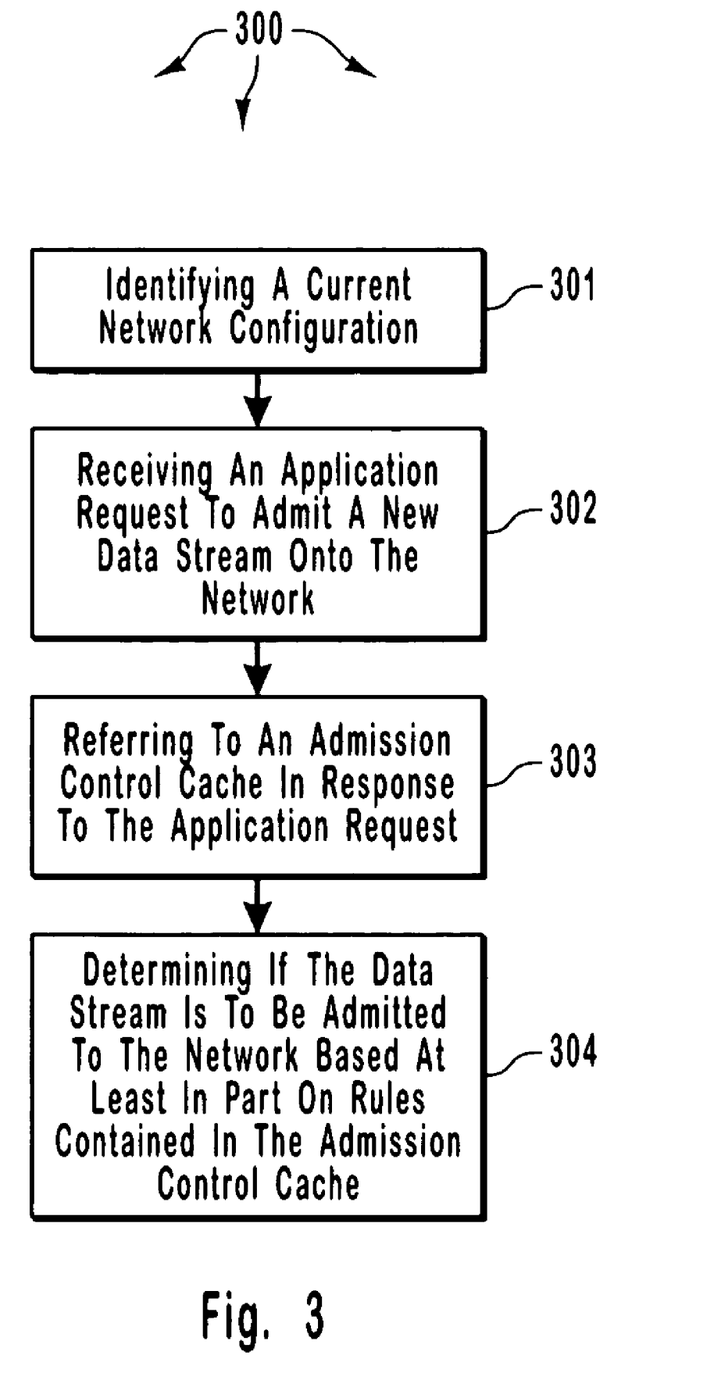
FIG. 3 illustrates an example flowchart of a method for more efficiently performing admission control in accordance with the principles of the present invention.

FIG. 3 illustrates an example flowchart 300 of a method for more efficiently performing admission control in accordance with the principles of the present invention. The method 300 will be discussed with respect to the networks and computer systems depicted in network architecture 100.

The method 300 includes an act of identifying a current network configuration (act 301). Act 301 can include a computer system identifying a current network configuration. For example, computer system 111 or media center computer system 121 can identify a current configuration of network 101. A current configuration can include identifying the aggregate maximum data transfer rate of data streams on network 101. For example, computer system 111 or media center computer system 121 can identify the maximum data transfer rate for variable rate stream 141. Identification of a maximum data transfer rate can result from conducting an active probing experiment (e.g., when a companion data stream is being transmitted) or may be received in a network message. For example, computer system 123 can send a network message to computer system 111 and/or media center computer system 121 indicating the maximum data transfer rate for variable rate stream 141.

The method 300 includes an act of receiving an application request to admit a new data stream onto the network (act 302). Act 302 can include a computer system receiving an application request to admit a new data stream onto the network. For example, computer system 111 or media center computer system 121 can receive an application request to admit a data stream from application 112.

The method 300 includes an act of referring to an admission control cache in response to the application request (act 303). Act 303 can include a computer system referring to an admission control cache in response to the application request. For example, when admission control module 113 receives an application request from application 112, admission control module 113 can refer to admission control cache 116 and/or admission control cache 151. When media center computer system 121 maintains an admission control cache for other computer systems connected to network 101, admission control module 113 can refer to admission control cache 151. On the other hand, when computer system 111 maintains an admission control cache for applications at computer system 111, admission control module 113 can refer to admission control cache 116.

The method 300 includes an act of determining if the data stream is to be admitted to the network based at least in part on rules contained in the admission control cache (act 304). Act 304 an can include a computer system determining if the data stream is to be admitted to the network based at least in part on rules contained in the admission control cache. For example, computer system 111 can determine if a data stream from application 112 is to be admitted onto network 101 based at least in part on rules contained in admission control cache 116 and/or admission control cache 151.

Rules contained in an admission control cache entry can include an indication of whether or not the new data stream (or other similar data stream) was previously admitted to the network when the network configuration was similar (or the same) to the current network configuration. When an admission control cache entry indicates that the new data stream (or other similar data stream) was previously admitted, the new data stream can be admitted to the network. On the other hand, when an admission control cache entry indicates that the new data stream (or other similar data stream) was previously not admitted, the new data stream is not admitted to the network. In either situation, a determination may be made without having to conduct a complete active probing experiment. Another possibility is that active probing has not been previously executed for the new data stream given the current network configuration. Accordingly, the complete active probing experiment can be conducted and the results of this experiment added to an admission control cache for future use.

Accordingly, reduced resources are consumed when determining whether or not to admit the new data stream to the network. For example, it may be that complete active probing experiments are not needed since the results of prior active probing experiments are cached. Thus, admission control can be performed more efficiently and quickly. An admission control cache can be particularly advantageous in a home network environment since home networks may include a limited number of computer systems that operate in a limited number of different configurations.

Other rules contained in an admission control cache entry can include an indication of whether not an entry is committed. Since network conditions can vary based on, sometimes uncontrollable, external events, a user may configure admission control modules to perform active probing experiments a specified number of times before an entry is committed. When the results of active probing are consistent the specified number of times, the entry is then committed to the admission control cache. This reduces the likelihood of a single (or reduced number of) active probing experiments incorrectly indicating that a network has or does not have sufficient bandwidth for a data stream.

Depending on the network environment a user can specify a higher or lower number of active probing experiments that are to be performed before an entry is committed. For example, in a wireless network environment (which is potentially susceptible to interference from other devices) admission control can be configured such that an increased number of active probing experiments must have consistent results before a corresponding entry is committed. On the other hand, in a wired network environment with a reduced number of computer systems, admission control can be configured such that a reduced number of active probing experiments must have consistent results before a corresponding entry is committed.

Admission control can be configured to automatically conduct active probing for a committed entry after the entry has been referred to a specified number of times or after some length of time has elapsed. Thus, from time to time, admission control cache entries can be validated and existing entries can be updated based on changed network environments. For example, when a network is reconfigured from 10 Mbps to 100 Mbps, existing cache entries may incorrectly indicate that some combinations of data streams can not be admitted.

When a cache entry indicates that a data stream is to be admitted, a probing module may perform an abbreviated active probing experiment to validate the cache entry. For example, a probing module can temporarily transfer data at the requested data transfer rate (as opposed to ramping up the data transfer rate in increments, performing promiscuous mode measurements, and/or packet-pair tests) to verify that the network has sufficient bandwidth for the data stream. Thus, a cache entry is validated without conducting a complete active probing experiment.

Figure 4:
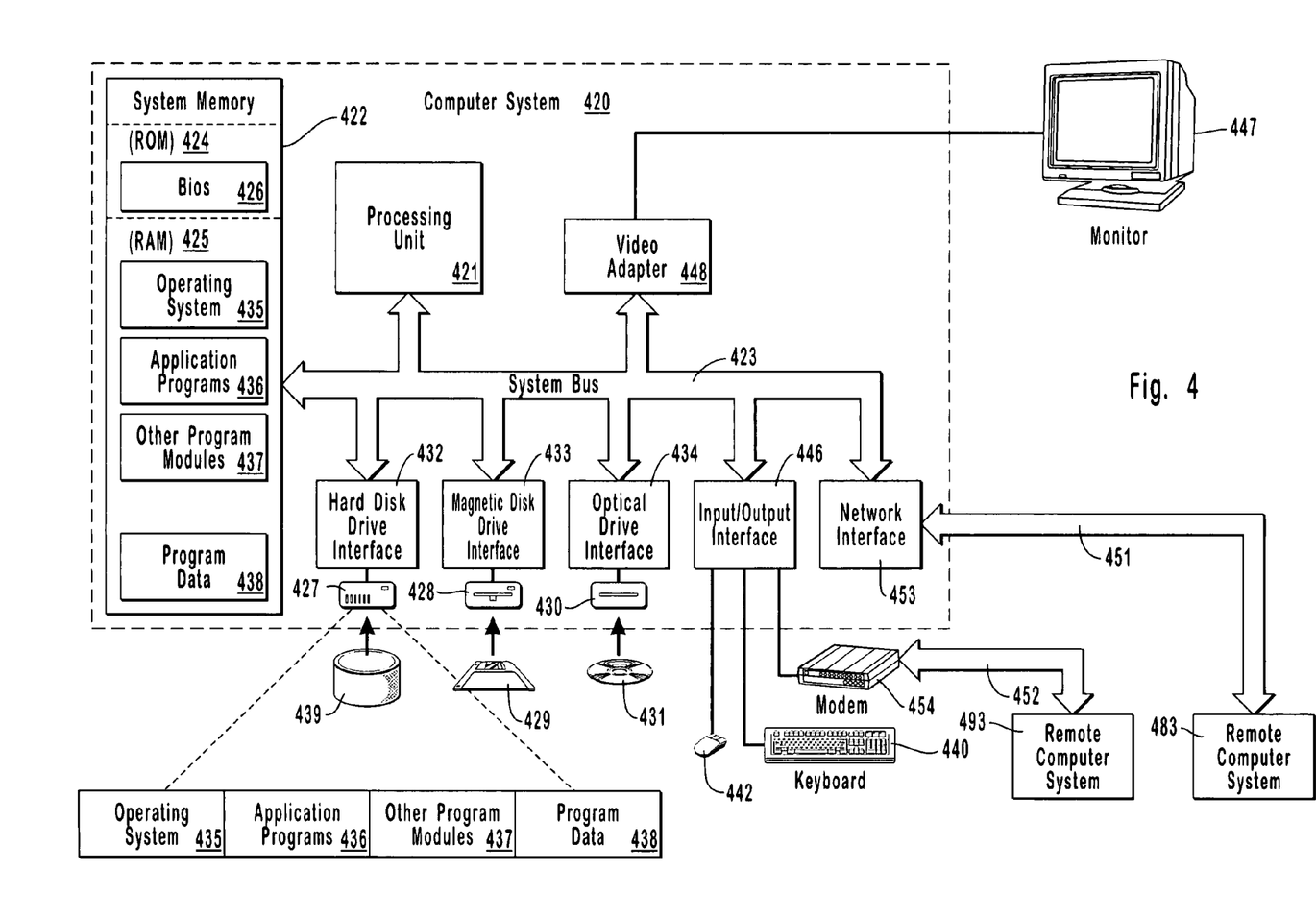
FIG. 4 illustrates a suitable operating environment for the principles of the present invention.

FIG. 4 and the following discussion are intended to provide a brief, general description of a suitable computing environment in which the invention may be implemented. Although not required, the invention will be described in the general context of computer-executable instructions, such as program modules, being executed by computer systems. Generally, program modules include routines, programs, objects, components, data structures, and the like, which perform particular tasks or implement particular abstract data types. Computer-executable instructions, associated data structures, and program modules represent examples of the program code means for executing acts of the methods disclosed herein.

With reference to FIG. 4, an example system for implementing the invention includes a general-purpose computing device in the form of computer system 420, including a processing unit 421, a system memory 422, and a system bus 423 that couples various system components including the system memory 422 to the processing unit 421. Processing unit 421 can execute computer-executable instructions designed to implement features of computer system 420, including features of the present invention. The system bus 423 may be any of several types of bus structures including a memory bus or memory controller, a peripheral bus, and a local bus using any of a variety of bus architectures. The system memory includes read only memory ("ROM") 424 and random access memory ("RAM") 425. A basic input/output system ("BIOS") 426, containing the basic routines that help transfer information between elements within computer system 420, such as during start-up, may be stored in ROM 424.

The computer system 420 may also include magnetic hard disk drive 427 for reading from and writing to magnetic hard disk 439, magnetic disk drive 428 for reading from or writing to removable magnetic disk 429, and optical disk drive 430 for reading from or writing to removable optical disk 431, such as, or example, a CD-ROM or other optical media. The magnetic hard disk drive 427, magnetic disk drive 428, and optical disk drive 430 are connected to the system bus 423 by hard disk drive interface 432, magnetic disk drive-interface 433, and optical drive interface 434, respectively. The drives and their associated computer-readable media provide nonvolatile storage of computer-executable instructions, data structures, program modules, and other data for the computer system 420. Although the example environment described herein employs magnetic hard disk 439, removable magnetic disk 429 and removable optical disk 431, other types of computer readable media for storing data can be used, including magnetic cassettes, flash memory cards, digital versatile disks, Bernoulli cartridges, RAMs, ROMs, and the like.

Program code means comprising one or more program modules may be stored on hard disk 439, magnetic disk 429, optical disk 431, ROM 424 or RAM 425, including an operating system 435, one or more application programs 436, other program modules 437, and program data 438. A user may enter commands and information into computer system 420 through keyboard 440, pointing device 442, or other input devices (not shown), such as, for example, a microphone, joy stick, game pad, scanner, or the like. These and other input devices can be connected to the processing unit 421 through input/output interface 446 coupled to system bus 423. Input/output interface 446 logically represents any of a wide variety of different interfaces, such as, for example, a serial port interface, a PS/2 interface, a parallel port interface, a Universal Serial Bus ("USB") interface, or an Institute of Electrical and Electronics Engineers ("IEEE") 1394 interface (i.e., a FireWire interface), or may even logically represent a combination of different interfaces.

A monitor 447 or other display device is also connected to system bus 423 via video interface 448. Speakers 469 or other audio output device is also connected to system bus 423 via audio interface 449. Other peripheral output devices (not shown), such as, for example, printers, can also be connected to computer system 420.

Computer system 420 is connectable to networks, such as, for example, an office-wide or enterprise-wide computer network, a home network, an intranet, and/or the Internet. Computer system 420 can exchange data with external sources, such as, for example, remote computer systems, remote applications, and/or remote databases over such networks.

Computer system 420 includes network interface 453, through which computer system 420 receives data from external sources and/or transmits data to external sources. As depicted in FIG. 1, network interface 453 facilitates the exchange of data with remote computer system 483 via link 451. Network interface 453 can logically represent one or more software and/or hardware modules, such as, for example, a network interface card and corresponding Network Driver Interface Specification ("NDIS") stack. Link 451 represents a portion of a network (e.g., an Ethernet segment), and remote computer system 483 represents a node of the network. For example, remote computer system 483 can be a transmitting computer system that transmits data streams to computer system 420. On the other hand, remote computer system 483 can be a receiving computer system that receives data streams transmitted from computer system 420.

Likewise, computer system 420 includes input/output interface 446, through which computer system 420 receives data from external sources and/or transmits data to external sources. Input/output interface 446 is coupled to modem 454 (e.g., a standard modem, a cable modem, or digital subscriber line ("DSL") modem) via data link 459, through which computer system 420 receives data from and/or transmits data to external sources. As depicted in FIG. 1, input/output interface 446 and modem 454 facilitate the exchange of data with remote computer system 493 via link 452. Link 452 represents a portion of a network and remote computer system 493 represents a node of the network. For example, remote computer system 493 may be a transmitting computer system that transmits data streams to computer system 420. On the other hand, remote computer system 493 may be a receiving computer system that receives data streams transmitted from computer system 420.

While FIG. 4 represents a suitable operating environment for the present invention, the principles of the present invention may be employed in any system that is capable of, with suitable modification if necessary, implementing the principles of the present invention. The environment illustrated in FIG. 4 is illustrative only and by no means represents even a small portion of the wide variety of environments in which the principles of the present invention may be implemented.

In accordance with the present invention, application modules, network interface modules, and probing modules as well as associated data, including data packets, transmission parameters, and data streams may be stored and accessed from any of the computer-readable media associated with computer system 420. For example, portions of such modules and portions of associated program data may be included in operating system 435, application programs 436, program modules 437 and/or program data 438, for storage in system memory 422.

When a mass storage device, such as, for example, magnetic hard disk 439, is coupled to computer system 420, such modules and associated program data may also be stored in the mass storage device. In a networked environment, program modules depicted relative to computer system 420, or portions thereof, can be stored in remote memory storage devices, such as, system memory and/or mass storage devices associated with remote computer system 483 and/or remote computer system 493. Execution of such modules may be performed in a distributed environment as previously described.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes, which come within the meaning and range of equivalency of the claims, are to be embraced within their scope.

What is claimed and desired secured by United States Letters Patent is:

1. In a requesting computer system that is network connectable along with one or more other computer systems to a network, a method for more accurately determining if the network has sufficient available resources to transfer a data stream, the method comprising:
   an act of broadcasting a start admission control message, the start admission control message signaling to the other computer systems that an active probing experiment is to be conducted;
   an act of conducting an active probing experiment to identify the available bandwidth of the network, the active probing experiment detecting network load caused by any other data stream and companion data stream being transferred from a transmitting computer system;
   an act of determining if the network has sufficient available bandwidth to transfer the data stream based on the results of the active probing experiment; and
   an act of broadcasting an end admission control message, the end admission control message signaling to the other computer systems that the active probing experiment has completed.

2. The method as recited in claim 1, wherein the act of conducting an active probing experiment to identify the available bandwidth of the network comprises performing promiscuous mode measurements.

3. The method as recited in claim 1, wherein the act of conducting an active probing experiment to identify the available bandwidth of the network comprises performing a packet-pair test.

4. The method as recited in claim 1, wherein the act of conducting an active probing experiment to identify the available bandwidth of the network comprises act of detecting network load caused by a companion stream that corresponds to a variable rate stream being transferred on the network, the combined data transfer rate of the companion stream and the variable rate stream at least approximately the maximum data transfer rate of the variable rate stream.

5. The method as recited in claim 1, wherein the act of conducting an active probing experiment to identify the available bandwidth of the network comprises an act of conducting an abbreviated active probing experiment to validate an admission control cache entry.

6. The method as recited in claim 1, wherein the data stream is a variable rate data stream.

7. In a transmitting computer system that is network connectable along with one or more other computer systems to a network, the network transferring a variable rate data stream that is being transmitted from the transmitting computer system, a method for more accurately representing the bandwidth that can be consumed by the variable rate data stream during an active probing experiment, the method comprising:
   an act of identifying a maximum data transfer rate for the variable rate data stream, the maximum data transfer rate representing the greatest data transfer rate at which the variable rate data stream is to be transmitted;
   an act of transmitting the variable rate data stream at a data transfer rate less than the maximum data transfer rate;
   an act of receiving a start admission control message from a requesting computer system, the requesting computer system being a computer system that is to conduct active probing to determine if the network has sufficient bandwidth to transmit a new data stream from the requesting computer system; and
   an act of transmitting a companion data stream along with the variable rate data stream in response to the start admission control message, the combined data transfer rate of the companion data stream and the variable rate data stream at least approximating the maximum data transfer rate.

8. The method as recited in claim 7, wherein the act of identifying a maximum data transfer rate for the variable rate data stream comprises an act of receiving an application request.

9. The method as recited in claim 7, where the act receiving a start admission control message from a requesting computer system, comprises an act of receiving a start admission control message from a requesting computer system that is validating an admission control cache entry.

10. The method recited in claim 7, further comprising:
    an act of receiving an end admission control message from the requesting computer system; and an act of terminating the companion data stream in response to the end admission control message.

11. The method as recited in claim 7, wherein the variable rate data stream is an A/V data stream.

12. In a transmitting computer system that is network connectable along with one or more other computer systems to a network, the network transferring a variable bit rate data stream that is being transmitted from the transmitting computer system, a method for more accurately representing the bandwidth that can be consumed by the variable bit rate data stream during an active probing experiment, the method comprising:

an act of identifying a maximum data transfer rate for the variable rate data stream, the maximum data transfer rate representing the greatest data transfer rate at which the variable rate data stream can be transmitted;

an act of transmitting the variable rate data stream at a data transfer rate less than the maximum data transfer rate; and a step for temporarily simulating that the variable rate stream is being transmitted at the maximum data transfer such that other computer systems performing active probing experiments generate more accurate results.

13. The method as recited in claim 12, wherein the step for a step for temporarily simulating that the variable rate stream is being transmitted at the maximum data transfer comprises:

a corresponding act of receiving a start admission control message from a requesting computer system, the requesting computer system being a computer system that is to conduct active probing to determine if the network has sufficient bandwidth to transmit a new data stream from the requesting computer system; and a corresponding act of transmitting a companion data stream along with the variable rate data stream in response to the start admission control message, the combined data transfer rate of the companion data stream and the variable rate data stream at least approximating the maximum data transfer rate;

a corresponding act of receiving an end admission control message from the requesting computer system; and a corresponding act of terminating the companion data stream in response to the end admission control message.

14. In a computer system that is network connectable along with one or more other computer systems to a network, a method for efficiently and quickly performing admission control, the method comprising:

an act of identifying the current network configuration of the network;

an act of receiving an application request to admit a new data stream onto the network;

an act of referring to an admission control cache, the admission control cache having an entry that corresponds to the new data stream and the current network configuration; and an act of determining if the data stream should be admitted onto the network based at least in part on rules contained in the entry such that the resources consumed to conduct admission control are significantly reduced.

15. The method as recited in claim 14, wherein the act of identifying the current network configuration of the network comprises an act of identifying the combined maximum data transfer rate of data streams being transferred on the network.

16. The method as recited in claim 14, wherein the act of referring to an admission control cache, comprises an act of referring to an admission control cache at the computer system.

17. The method as recited in claim 14, wherein the act of referring to an admission control cache, comprises an act of referring to an admission control cache at one of the one or more other computer systems.

18. The method recited in claim 14, wherein the act of referring to an admission control cache comprises an act of referring to an admission control cache entry that contains a previously generated indication indicating whether or not a data stream at least similar to the new data stream was admitted onto the network when the network had a network configuration similar to the current network configuration.

19. The method as recited in claim 14, wherein the act of determining if the data stream should be admitted onto the network based at least in part on rules contained in the entry comprises an act of determining if the entry is committed.

20. The method as recited in claim 14, wherein the act of determining if the data stream should be admitted onto the network based at least in part on rules contained in the entry comprises an act of referring to rules that indicate the new data stream is to be admitted to the network.

21. The method as recited in claim 20, further comprising:
an act of conducting an abbreviated active probing experiment to validate the entry.

22. The method as recited in claim 14, wherein the act of determining if the data stream should be admitted onto the network based at least in part on rules contained in the entry comprises an act of referring to rules that indicate the new data stream is not to be admitted to the network.

23. The method as recited in claim 14, wherein the act of determining if the data stream should be admitted onto the network based at least in part on rules contained in the entry comprises:
an act of determining that the entry is to be validated; and
an act of performing an active probing experiment to validate the entry.

24. A computer program product for use in a requesting computer system that is network connectable along with one or more other computer systems to a network, the computer program product for implanting a method for more accurately determining if the network has sufficient available resources to transfer a data stream, the computer program product comprising one or more computer-readable media having stored thereon computer executable instructions that, when executed by a processor, cause the requesting computer system to perform the following:

broadcast a start admission control message, the start admission control message signaling to the other computer systems that an active probing experiment is to be conducted;

conduct an active probing experiment to identify the available bandwidth of the network, the active probing experiment detecting network load caused by any other data stream and companion data stream transferred from a transmitting computer system;

determine if the network has sufficient available bandwidth to transfer the data stream based on the results of the active probing experiment; and broadcast an end admission control message, the end admission control message signaling to the other computer systems that the active probing experiment has completed.

25. The computer program product as recited in claim 24, wherein computer-executable instructions that, when executed, cause the requesting computer system to conduct an active probing experiment to identify the available bandwidth of the network, comprise computer-executable instructions that, when executed, cause the requesting computer system to detect network load caused by a companion stream that corresponds to a variable rate stream being transferred on the network, the combined data transfer rate of the companion stream and the variable rate stream at least approximately the maximum data transfer rate of the variable rate stream.

26. A computer program product for use in a transmitting computer system that is network connectable along with one or more other computer systems to a network, the network transferring a variable rate data stream that is being transmitted from the transmitting computer system, the computer program product for implementing a method for more accurately representing the bandwidth that can be consumed by the variable rate data stream during an active probing experiment, the computer program product comprising one or more computer-readable media having stored thereon computer executable instructions that, when executed by a processor, cause the transmitting computer system to perform the following:

identify a maximum data transfer rate for the variable rate data stream, the maximum data transfer rate representing the greatest data transfer rate at which the variable rate data stream is to be transmitted;

transmit the variable rate data stream at a data transfer rate less than the maximum data transfer rate;

receive a start admission control message from a requesting computer system, the requesting computer system being a computer system that is to conduct active probing to determine if the network has sufficient bandwidth to transmit a new data stream from the requesting computer system; and transmit a companion data stream along with the variable rate data stream in response to the start admission control message, the combined data transfer rate of the companion data stream and the variable rate data stream at least approximating the maximum data transfer rate.

27. The computer program product as recited in claim 26, further comprising one or more computer-readable media having stored thereon computer executable instructions that, when executed by a processor, cause the transmitting computer system to perform the following:

receive an end admission control message from the requesting computer system; and terminate the companion data stream in response to the end admission control message.

28. A computer program product for use in a computer system that is network connectable along with one or more other computer systems to a network, the computer program product for implementing a method for efficiently performing admission control, the computer program product comprising one or more computer-readable media having stored thereon computer executable instructions that, when executed by a processor, cause the computer system to perform the following:

identify the current network configuration of the network;

receive an application request to admit a new data stream onto the network;

refer to an admission control cache, the admission control cache having an entry that corresponds to the new data stream and the current network configuration; and determine if the data stream should be admitted onto the network based at least in part on rules contained in the entry such that the time and resources consumed to conduct admission control are significantly reduced.

* * * * *